US012593085B2

(12) United States Patent
Zheng et al.

(10) Patent No.: US 12,593,085 B2
(45) Date of Patent: Mar. 31, 2026

(54) EXTENDED METADATA BLOCKS IN MEDIA TRANSPORT FRAMES

(71) Applicant: NETFLIX, INC., Los Gatos, CA (US)

(72) Inventors: Weiguo Zheng, San Jose, CA (US); Michael Aki Schassberger, San Ramon, CA (US); Yongjun Jeon, Santa Clara, CA (US)

(73) Assignee: NETFLIX, INC., Los Gatos, CA (US)

( * ) Notice: Subject to any disclaimer, the term of this patent is extended or adjusted under 35 U.S.C. 154(b) by 0 days.

(21) Appl. No.: 18/762,345

(22) Filed: Jul. 2, 2024

(65) Prior Publication Data

US 2026/0012664 A1    Jan. 8, 2026

(51) Int. Cl.
*H04N 21/2343* (2011.01)
*H04N 21/235* (2011.01)

(52) U.S. Cl.
CPC ....... *H04N 21/2343* (2013.01); *H04N 21/235* (2013.01)

(58) Field of Classification Search
CPC ......... H04N 21/44016; H04N 21/4402; H04N 21/44204; H04N 21/812; H04N 21/8456; H04N 21/23424; H04N 21/2353; H04N 21/2625; H04N 21/8455
See application file for complete search history.

(56) References Cited

U.S. PATENT DOCUMENTS

| | | |
|---|---|---|
| 2005/0234731 A1 | 10/2005 | Sirivara et al. |
| 2008/0260385 A1* | 10/2008 | Eguchi ..................... H04J 4/00 |
| 2009/0010263 A1* | 1/2009 | Ma .......................... H04L 12/56 |
| 2016/0248870 A1 | 8/2016 | Tsukagoshi |
| 2019/0392845 A1* | 12/2019 | Peters .................. G10L 19/008 |
| 2020/0314690 A1* | 10/2020 | Kim ...................... H04W 28/06 |

OTHER PUBLICATIONS

International Search Report for Application No. PCT/US2025/036144 dated Oct. 6, 2025.

* cited by examiner

*Primary Examiner* — Anthony Bantamoi
(74) *Attorney, Agent, or Firm* — Artegis Law Group, LLP

(57) ABSTRACT

In various embodiments a computer-implemented method for transmitting frames of media content to a client device. The method includes generating a frame for a portion of media content, generating a header for the frame based on the portion of the media content, and generating one or more metadata blocks for the frame corresponding to a media encoding format, where the one or more metadata blocks include metadata incompatible with the header. The method further includes incorporating the header into a header portion of the frame, incorporating the portion of media content and the one or more metadata blocks into a payload portion of the frame, and transmitting the frame to a client device for playback.

20 Claims, 10 Drawing Sheets

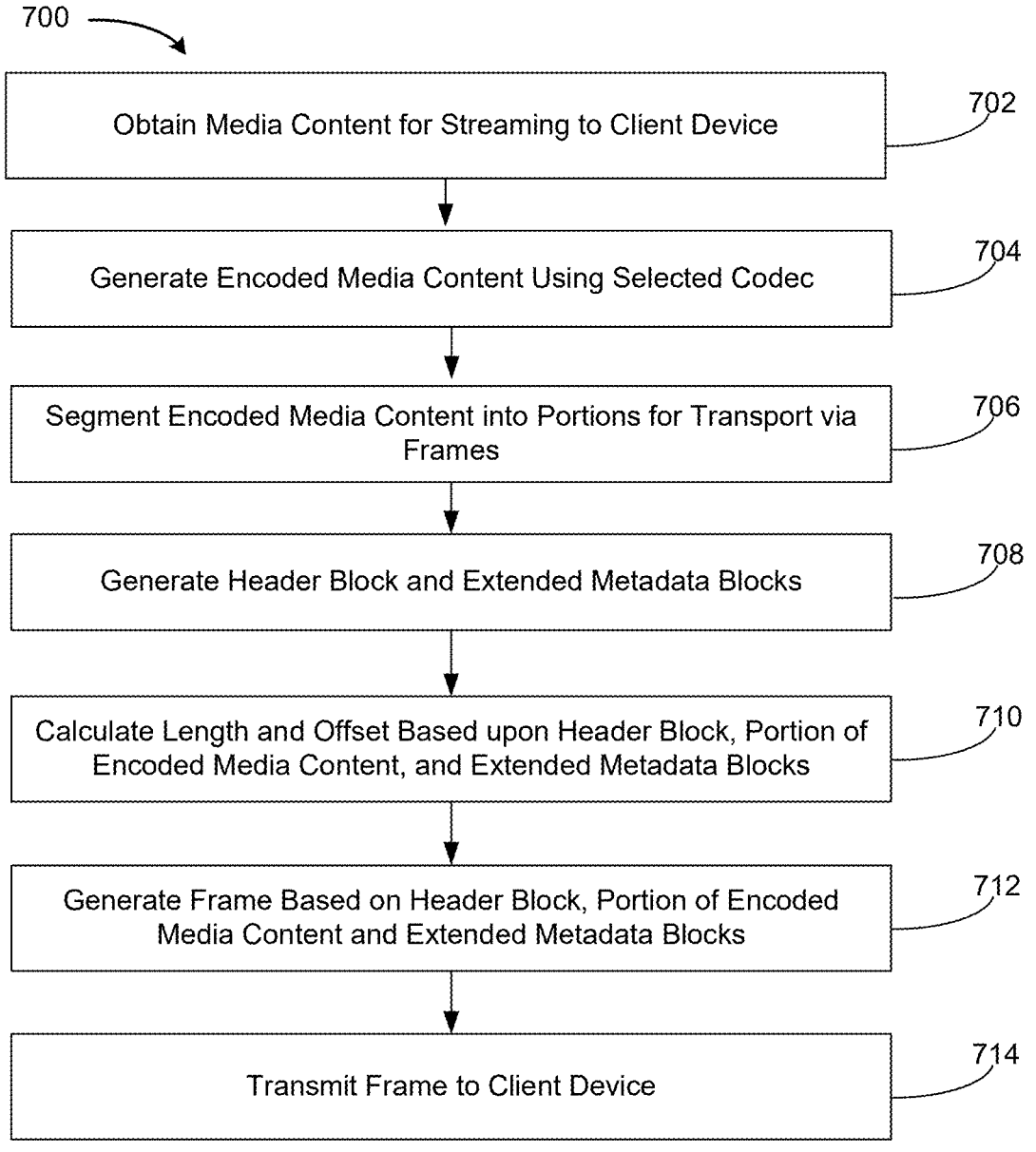

700

Obtain Media Content for Streaming to Client Device          702

Generate Encoded Media Content Using Selected Codec          704

Segment Encoded Media Content into Portions for Transport via Frames          706

Generate Header Block and Extended Metadata Blocks          708

Calculate Length and Offset Based upon Header Block, Portion of Encoded Media Content, and Extended Metadata Blocks          710

Generate Frame Based on Header Block, Portion of Encoded Media Content and Extended Metadata Blocks          712

Transmit Frame to Client Device          714

FIGURE 7

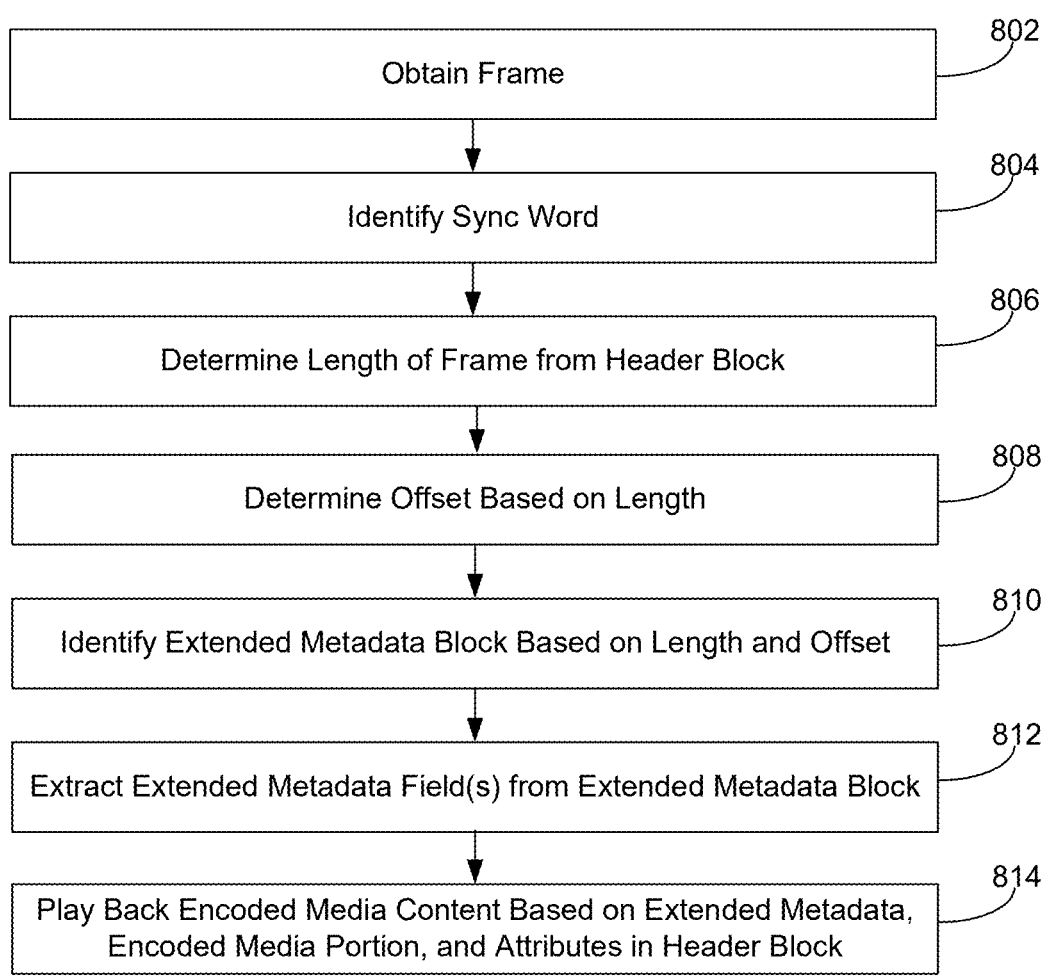
800
| 802 |
| :---: |
| Obtain Frame |
↓
| 804 |
| :---: |
| Identify Sync Word |
↓
| 806 |
| :---: |
| Determine Length of Frame from Header Block |
↓
| 808 |
| :---: |
| Determine Offset Based on Length |
↓
| 810 |
| :---: |
| Identify Extended Metadata Block Based on Length and Offset |
↓
| 812 |
| :---: |
| Extract Extended Metadata Field(s) from Extended Metadata Block |
↓
| 814 |
| :---: |
| Play Back Encoded Media Content Based on Extended Metadata, Encoded Media Portion, and Attributes in Header Block |
FIGURE 8

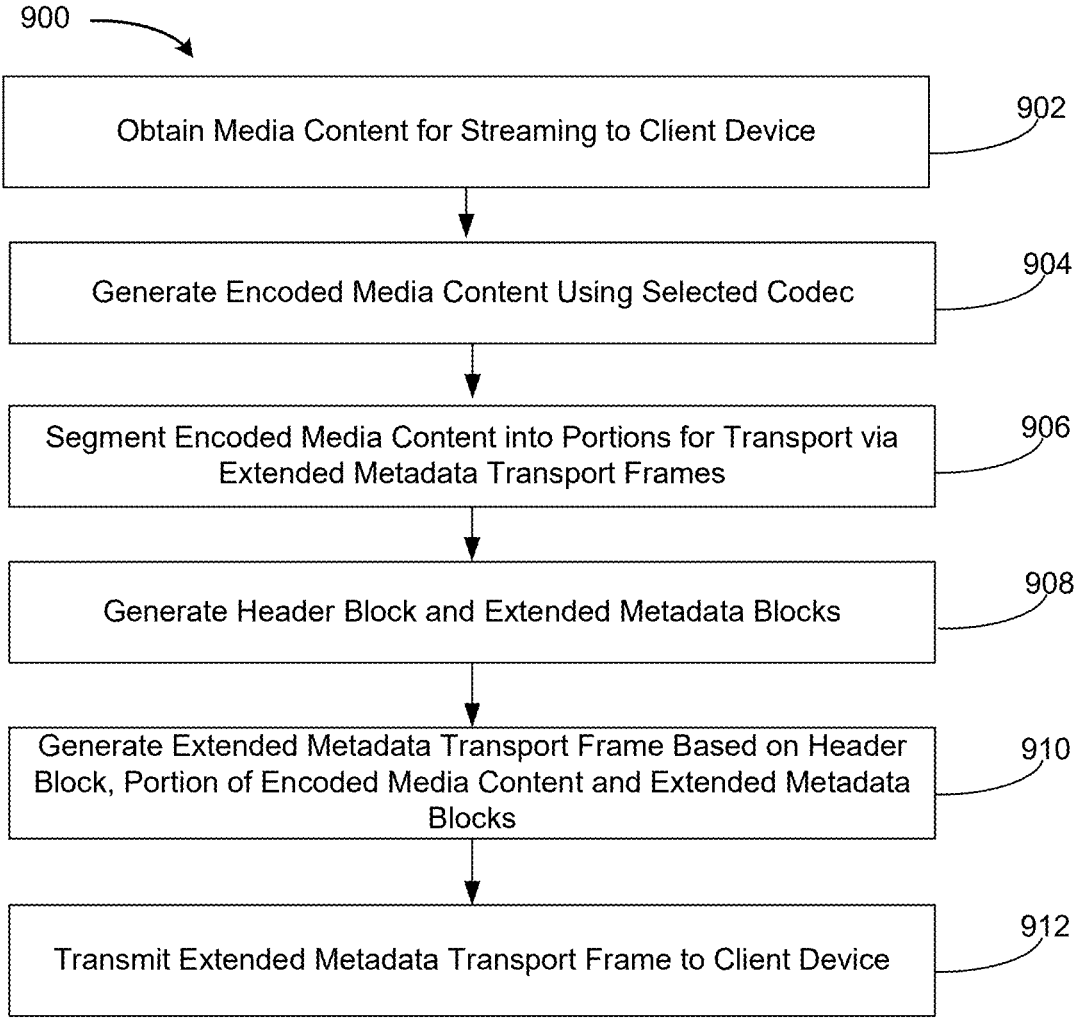

900

Obtain Media Content for Streaming to Client Device    902

Generate Encoded Media Content Using Selected Codec    904

Segment Encoded Media Content into Portions for Transport via Extended Metadata Transport Frames    906

Generate Header Block and Extended Metadata Blocks    908

Generate Extended Metadata Transport Frame Based on Header Block, Portion of Encoded Media Content and Extended Metadata Blocks    910

Transmit Extended Metadata Transport Frame to Client Device    912

FIGURE 9

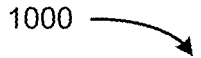
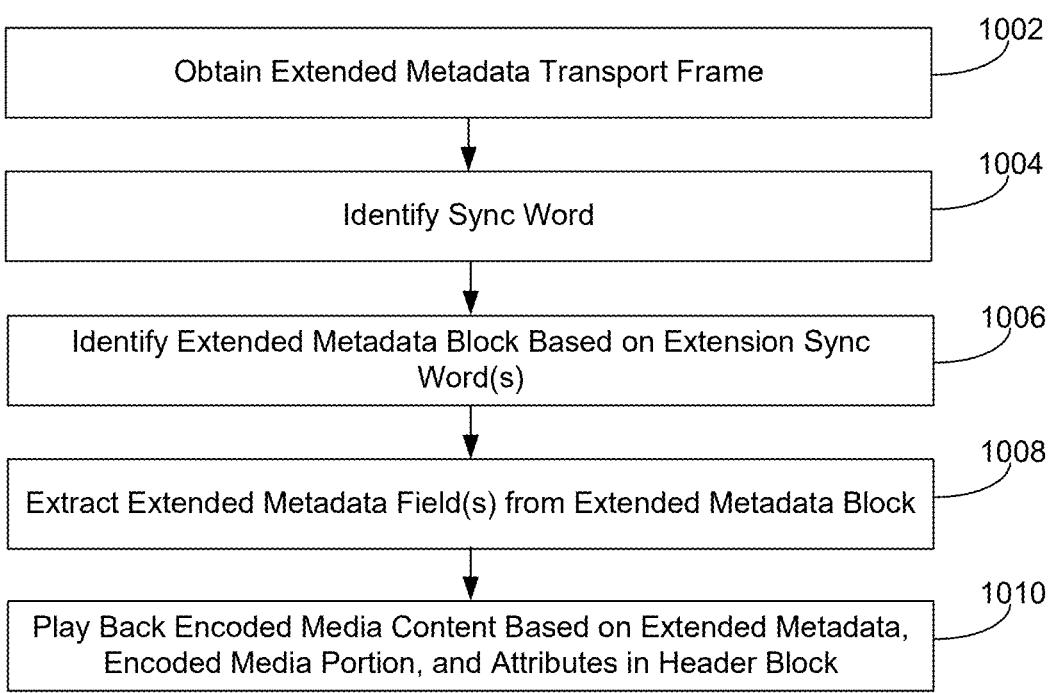
1000
| 1002 |
| --- |
| Obtain Extended Metadata Transport Frame |
| 1004 |
| --- |
| Identify Sync Word |
| 1006 |
| --- |
| Identify Extended Metadata Block Based on Extension Sync Word(s) |
| 1008 |
| --- |
| Extract Extended Metadata Field(s) from Extended Metadata Block |
| 1010 |
| --- |
| Play Back Encoded Media Content Based on Extended Metadata, Encoded Media Portion, and Attributes in Header Block |
FIGURE 10

EXTENDED METADATA BLOCKS IN MEDIA TRANSPORT FRAMES

BACKGROUND

Field of the Various Embodiments

Embodiments of the present disclosure relate generally to computer science and streaming and digital media technologies and, more specifically, to extended metadata blocks in media transport frames.

Description of the Related Art

Streaming media content from a server machine to client devices oftentimes involves formatting the media content into a media container format. Various container formats are used to stream media content, depending on the type of client device requesting the streamed media content and the type of media content being streamed. For example, certain container formats are designed for streaming audio content, and other container formats are designed for streaming audio and video content. In the case of streaming audio content, one container format that can be used is the audio data transport stream (ADTS) format specified by the MPEG-4, Part 3 standard for audio data. ADTS is frequently used to stream audio data encoded using advanced audio codec (AAC), which is an audio encoding format that is supported by most client device operating systems.

Utilizing ADTS and other container formats usually involves separating audio content, such as content encoded using AAC or another codec supported by the container format, into multiple portions. The multiple portions of audio content are then packetized into frames. A given ADTS frame typically includes a header block and a payload that includes media elementary data corresponding to a particular portion of the audio content. When the audio content is streamed from a server machine to a client device, the server typically encapsulates the ADTS frames according to a container format before transmitting the ADTS frames to a client device for decoding and playback.

Upon receiving a stream that includes ADTS frames, the client device extracts the audio content from the payload of ADTS frames, decodes the extracted audio content, and subsequently plays back the decoded audio content. The header blocks of the ADTS frames normally include information, such as metadata, that facilitates extracting the encoded audio content from the ADTS frames. For example, an ADTS header block can include a sync word, which is a sequence of bits used to identify the start of a frame within a stream of audio content. The ADTS header block also can include a length field that specifies the overall size of the ADTS frame. Further, the ADTS header block can include data attributes that comprise metadata and are used to configure the decoder used to decode the encoded audio content included in an ADTS frame.

Media container formats sometimes include restrictions on the amount and type of data that can be stored in a header block of a given frame. Because of those restrictions, some media container formats do not provide sufficient support for evolving media encoding formats and may not support new media encoding formats developed in the future. For example, the profile field of a header block defines the complexity and capability of the audio compression technique used when encoding the audio content included in the payload. The ADTS header format specifies a header block that includes a profile field that is only two bits in length, which restricts the profile field to representing only four distinct values. The value of the profile field should reflect the Audio Object Type (AOT) used in the encoding process. However, there are currently far more than four Audio Object Types now used for encoding audio content. For example, the Unified Speed and Audio Coding (USAC) codec is assigned an AOT value of forty-two, which cannot be represented using a two-bit profile field. Despite these types of restrictions, container formats, such as ADTS, remain useful because the container formats are backward-compatible with legacy audio codes, such as AAC, AAC Low Complexity (AAC-LC), High-Efficiency AAC (HE-AAC) v1, or HE-AAC v2, that are supported by a wide variety of client devices and operating systems, particularly older client devices and operating systems.

Accordingly, one drawback of utilizing transport formats such as ADTS to transport media content is the restriction on the amount of data that can be stored in the header block that is used to configure decoder parameters of a client device. The limitation on the amount of data that can be stored in the header block leads to inadequate representation of codecs that are used to encode media content. Such a limitation prevents numerous codecs from being properly represented by the limited number of header block values. This limitation can lead to incorrect or suboptimal decoding settings when newer or less common codecs are utilized. Additionally, the limitations of the header block of transport formats such as ADTS also leads to incompatibility. Streaming clients that rely on the information in the header block to configure a decoder might fail to correctly identify and process audio streams encoded using newer codecs, which can result in playback errors, reduced audio quality or decoding failure.

As the foregoing illustrates, what is needed in the art are more effective techniques for transporting encoded media content while streaming media content.

SUMMARY

Various embodiments set forth techniques for encoding media frames for streaming media content. One embodiment of the present disclosure sets forth a computer-implemented method generating encoded media content for streaming to a client device for playback. The method includes generating a frame for a portion of media content and generating a header for the frame based on the portion of the media content. The method further includes generating one or more metadata blocks for the frame corresponding to a media encoding format, wherein the one or more metadata blocks include metadata incompatible with the header. The method further includes, incorporating the header into a header portion of the frame, incorporating the portion of media content and the one or more metadata blocks into a payload portion of the frame, and transmitting the frame to a client device for playback.

At least one technical advantage of the disclosed techniques relative to the prior art is that, when implemented, the disclosed techniques result in an extension of legacy media container formats, such as ADTS, that impose limitations on the amount or type of data that can be stored in a header block or in metadata fields. Accordingly, the disclosed techniques enable more advanced codecs to be utilized and transported using such media container formats, which can increase overall streaming and playback quality. Another technical advantage is that the disclosed techniques enable backward compatibility of legacy media container formats with advanced codecs that require additional metadata beyond the limitations imposed by the container format header block, which is particularly advantageous in the context of streaming media content to a wide variety of streaming clients. These technical advantages provide one or more technological improvements over prior art approaches

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 7 is a flow diagram of method steps for generating frames of media content, according to various embodiments;

FIG. 8 is a flow diagram of method steps for decoding media content from frames, according to various embodiments;

FIG. 9 is a flow diagram of method steps for generating extended metadata transport frames of media content, according to various embodiments; and FIG. 10 is a flow diagram of method steps for decoding extended metadata transport frames from frames, according to various embodiments.

DETAILED DESCRIPTION

Figure 1:
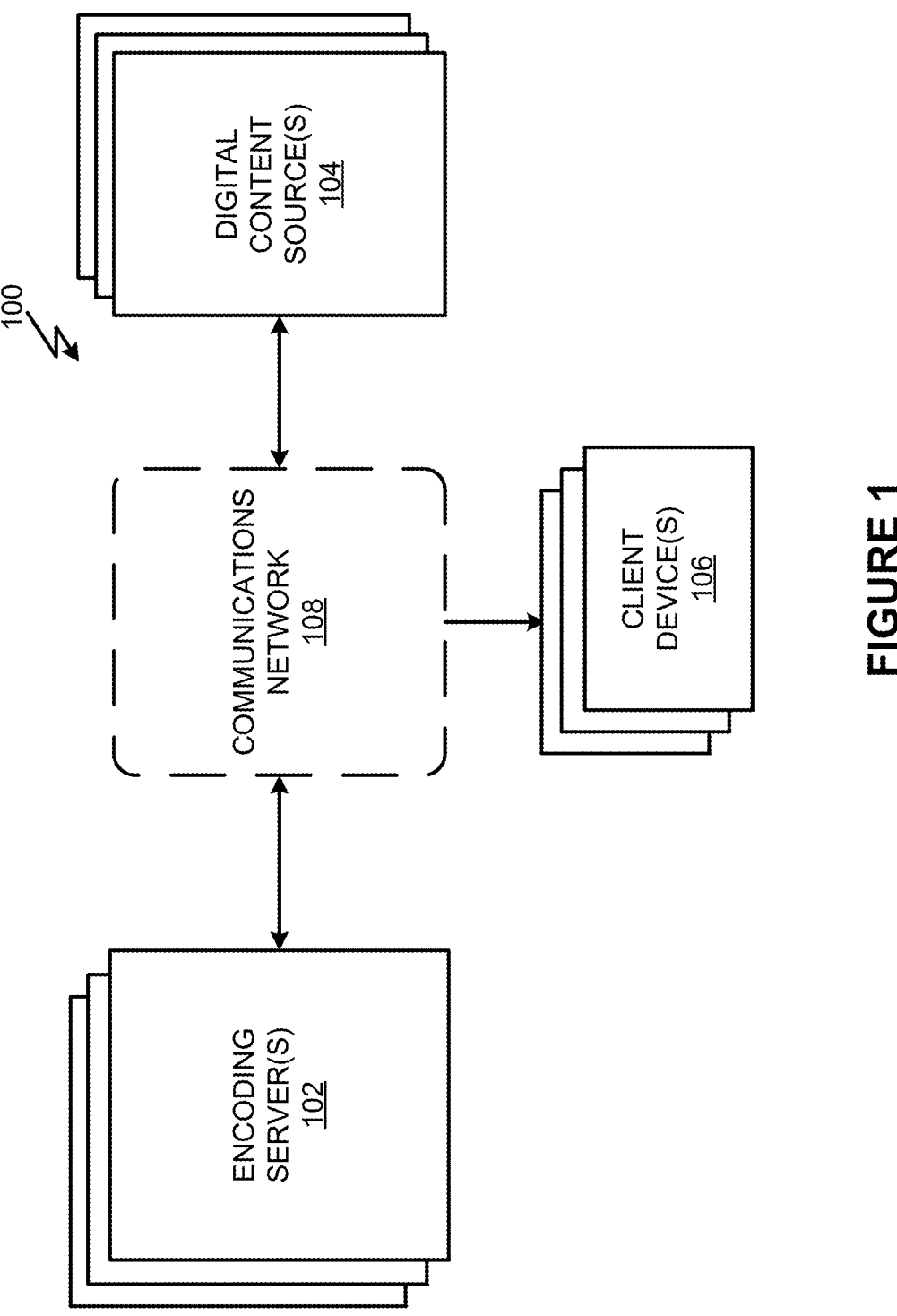
FIG. 1 illustrates a digital content streaming system configured to implement one or more aspects of the various embodiments.

In the following description, numerous specific details are set forth to provide a more thorough understanding of the embodiments of the present invention. However, it will be apparent to one of skill in the art that the embodiments of the present invention may be practiced without one or more of these specific details.

To stream media content to streaming clients, a server of a streaming service typically packetizes frames of encoded media content and transmits the frames in a sequence to one or more client devices of the streaming service for playback. There are various transport formats, also referred to as container formats, that are utilized for different types of client devices and different types of media content depending upon the media source being streamed. As audio and video codecs evolve and advance, new types of metadata emerge for these codecs. However, many transport formats that are utilized by streaming services and are supported by streaming clients do not support comprehensive metadata sets because the transport formats were not initially designed with extensive support for large metadata sets. Larger metadata sets are utilized by modern and yet-to-be designed audio and video codecs to embed various parameters that are used to assist a media streaming client to receive and properly decode the elementary media data that is provided to the streaming client. For example, the ADTS header format specifies a header block that includes a profile field that is two bits in length. This size limitation restricts the profile field to representing only four distinct values. The profile field defines the complexity and capability of the audio compression technique utilized to encode the audio content transported using the transport format. As audio encoding techniques and formats evolve, a two-bit profile field can prove to be insufficient. The value of the profile field is derived from the Audio Object Type (AOT) used in the encoding process, and there are presently more than four Audio Object Types now in use for encoding audio content. For example, the Unified Speed and Audio Coding (USAC) codec is assigned an AOT value of forty-two, which cannot be represented using a two-bit profile field.

In some embodiments, an encoding server encodes media content into encoded media content. The encoded media content includes one or more of audio or video content. Subsequent to encoding the media content into encoded media content, and the encoding server (or another server) can packetize the encoded media content into frames according to a selected transport format, which can then be streamed by the encoding server (or another server) to a client device for playback. A client application running on the client device obtains a stream of frames in the transport format that each include portions of the encoded media as payload data. The client application decodes the encoded media and can subsequently play back the media content on an output device.

In some embodiments, an approach to addressing the lack of support for newer or less common codecs in existing transport formats involves appending one or more metadata blocks that include metadata fields to the payload of a transport frame. A frame of data according to the transport format, in general, has a header block that includes metadata and other information about the frame, as well as payload block that is intended to store encoded media content, also referred to as media elementary data. One or more metadata blocks can be appended to the payload block of each frame that is created according to the transport format. The encoded media content and the one or more metadata blocks are separated by an extension sync word. Additionally, an offset field is provided at the end of the payload block to specify a distance from the end of the frame to the extension sync word.

At least one technical advantage of the disclosed techniques relative to the prior art is that, when implemented, the disclosed techniques result in an extension of legacy media transport formats, such as ADTS, that impose limitations on the amount or type of data that can be stored in a header block. Accordingly, the disclosed techniques enable more advanced codecs to be utilized and transported using such media container formats, which can increase overall streaming and playback quality. Another technical advantage is that the disclosed techniques enable backward compatibility of legacy media transport formats with advanced codecs that require additional metadata beyond the limitations imposed by the transport format header blocks, which is particularly advantageous in the context of streaming media content to a wide variety of streaming clients. These technical advantages provide one or more technological improvements over prior art approaches.

System Overview

FIG. 1 illustrates a digital content streaming system 100 configured to implement one or more aspects of various embodiments. As shown, the digital content streaming system 100 includes encoding servers 102, digital content sources 104, and client devices 106, which are connected via a communications network 108. In the following description, encoding servers 102 can be referred to individually as an encoding server 102, digital content sources 104 can be referred to individually as a digital content source 104, and client devices 106 can be referred to individually as a client device 106.

The communications network 108 includes a plurality of network communications systems, such as routers and switches, configured to facilitate data communication between the encoding servers 102, the digital content sources 104, and the client devices 106. Persons skilled in the art will recognize that many technically feasible techniques exist for building the communications network 108, including technologies practiced in deploying the well-known internet communications network. In some examples, one or more digital content sources 104 can be connected directly to an encoding server 102 without using the communications network 108.

In operation of the digital content streaming system 100, an encoding server 102 streams, via the communications network 108, media content to one or more client devices 106 for playback. The media content can be, for example, received from one or more digital content sources 104 or can be stored and generated locally on the encoding server 102. The encoding server 102 generates frames of the media content according to a transport format. The encoding server 102 can generate the frames in real-time or near-real time. In some other embodiments, the encoding server 102 can generate frames of encoded media content according to a transport format, and the encoded frames can be streamed by one or more other servers to the one or more client devices 106 for playback. In some examples, the encoding server 102 generates a sequence of frames of the media content in which the encoding server 102 transmits each frame of media content in the sequence individually. When a client device 106 receives a frame of media content that is streamed from the encoding server 102, the client device 106 decodes the encoded media content in the frame and plays back the decoded media content. Although the disclosed techniques are described herein primarily with respect to traditional content streaming, persons skilled in the art will recognize that the disclosed techniques can also be applied to the livestreaming of live content in real time or near real time.

As will further be described in more detail herein, to stream media content to one or more client devices 106, the encoding server 102 can select an encoding format for the underlying media content. In other words, the encoding server 102 can select a codec that is used to encode audio and/or video content that is streamed to the one or more client devices 106. Examples of codecs include advanced audio coding (AAC), MPEG-4 Audio, Unified Speech and Audio Config (USAC), Free Lossless Audio Codec (FLAC), and MPEG-1/MPEG-2 Audio Layer, I, II, or III format, to name a few. A transport format contains encoded audio and/or video content. A transport format is also referred to as a container format. Examples of media container formats include Audio Data Transport Stream (ADTS), Web Media (WebM), Third Generation Partnership (3GP), or the Free Lossless Audio Codec container format (FLAC), to name a few.

Once a codec is selected by the encoding server 102 for encoding media content, a compatible transport format is selected that supports the selected codec, and the encoding server 102 can packetize the encoded media content into one or more files or one or more bitstreams according to the transport format. In the case of a bitstream that is streamed to a client device 106, the encoded media is segmented into portions and packetized into frames as specified by the transport format. Accordingly, the encoding server 102 can also act as a streaming server that sends frames to a client device 106. In other examples, frames are streamed to a client device 106 by a streaming server and/or via a content delivery network that is distinct from the encoding server 102.

A transport format specifies the format of a header block that includes, for instance, a sync word that signifies the beginning of a frame of data, the format of attributes or metadata that can be included in a header block of a frame, the format or location of error checking data, such as a cyclic redundancy check (CRC) code, and other information that is optional or required to be included in the header block of a frame. Examples of attributes or metadata that can be included in a header block of a frame include a sample rate, channel configure that specifies the configuration of audio channels, bit depth, codec type, and/or other parameters that are utilized to decode and render the encoded media content packetized into a file or bitstream according to a transport format. In addition to a header block, a frame can further include a payload. A portion of the encoded media content can be stored in the payload. A client device 106 can subsequently extract the encoded media content from the payload of the frame and decode or render the media content using a decoder that can be configured using the information stored in the header block of the frame.

Embodiments of the disclosure add one or more metadata blocks to the payload portion of the frame, which can be accessed by a client application running on a client device 106 to configure decoding operations performed by the client application to decode and play back the encoded media content included in the frame. The one or more metadata blocks are appended to the payload portion of the frame after the encoded media content. By including additional metadata block(s) in the payload of the frame, the structure of the frame remains compliant with a selected transport format. However, the additional metadata block(s) can still be accessed by a client device 106 to decode the encoded media content. In this way, the frame remains backward compatible for those client devices 106 that do not require access to the additional metadata block(s), but other client devices 106 can be able to access the additional metadata block(s) from the payload of the frame.

In some examples, the media content that is streamed from an encoding server 102 to one or more client devices 106 is generated by one or more digital content sources 104. In such examples, a digital content source 104 generates and transmits media content to the encoding server 102. The encoding server 102 then encodes the media content and packetizes the encoded media content into frames that are transmitted to one or more client devices 106 for playback. The one or more digital content sources 104 can include, without limitation, a video camera, a mobile computing device, a desktop computer, a server machine, a gaming console, and/or some other type of electronic device that is capable of generating media content. In some examples, a client device 106 can be implemented as a media content source 104.

In some other examples, the media content that is streamed from an encoding server 102 to one or more client devices 106 is generated or stored locally on the encoding server 102. In such examples, the encoding server 102 generates media content, encodes the media content, generates frames of the encoded media content according to a transport format, and transmits the frames to one or more client devices 106 for playback.

Figure 2:
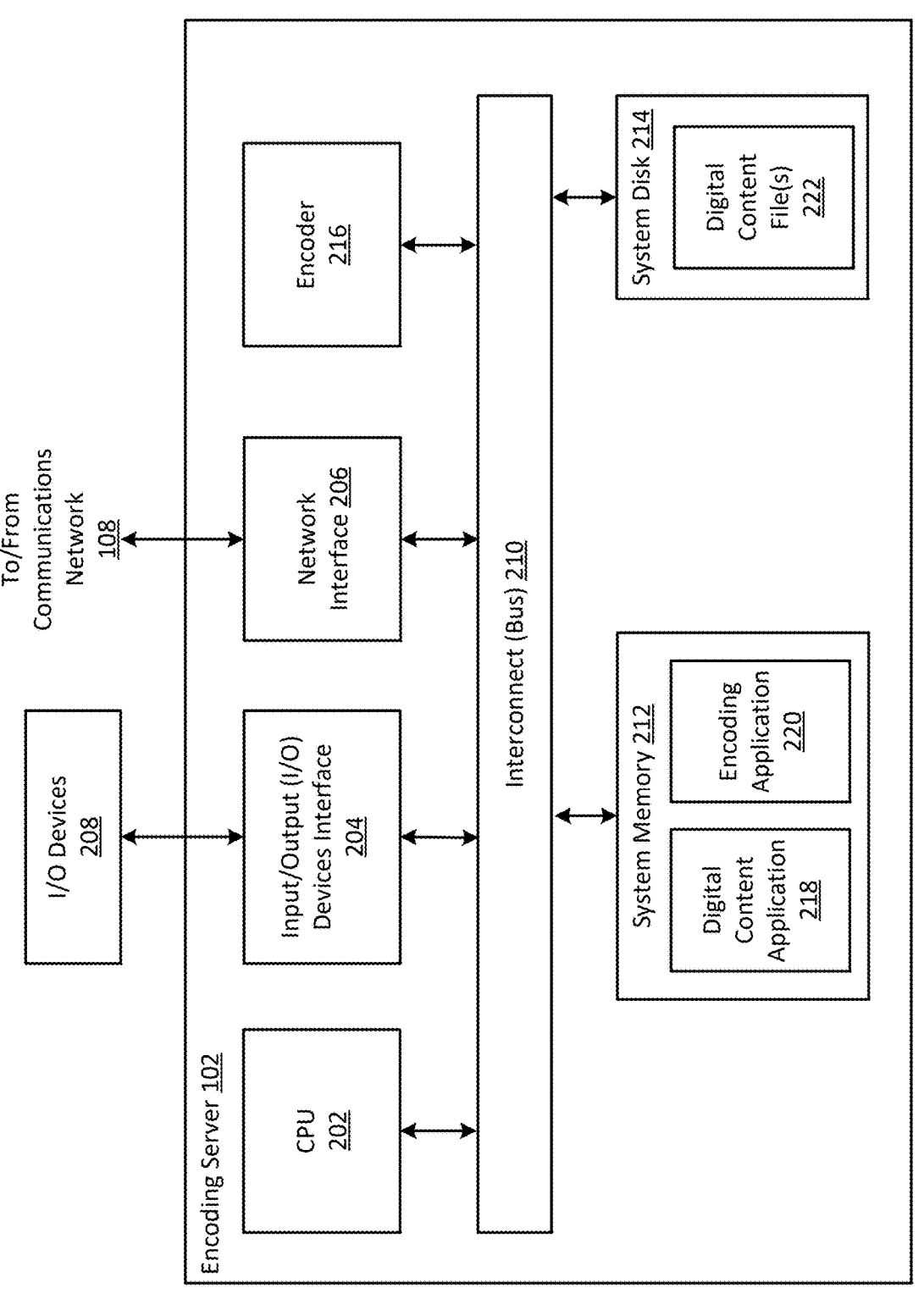
FIG. 2 is a more detailed illustration of one of the encoding servers of FIG. 1, according to various embodiments.

FIG. 2 is a more detailed illustration of one of the encoding servers 102 of FIG. 1, according to various embodiments. As shown, an encoding server 102 includes, without limitation, a central processing unit (CPU) 202, an input/output (I/O) devices interface 204, a network interface 206, I/O devices 208, an interconnect 210, a system memory 212, a system disk 214, and an encoder 216.

The CPU 202 is configured to retrieve and execute programming instructions, such as encoding application 220 and digital content application 218, stored in the system memory 212. Similarly, the CPU 202 is configured to store application data (e.g., software libraries) and retrieve application data from the system memory 212. The interconnect 210 is configured to facilitate transmission of data, such as programming instructions and application data, between the CPU 202, I/O devices interface 204, the network interface 206, the system memory 212, and the system disk 214. The I/O devices interface 204 is configured to receive input data from I/O devices 208 and transmit the input data to the CPU 202 via the interconnect 210. For example, I/O devices 208 may include one or more buttons, a keyboard, a mouse, and/or other input devices. The I/O devices interface 204 is further configured to receive output data from the CPU 202 via the interconnect 210 and transmit the output data to the I/O devices 208. In some examples, I/O devices 208 can include a digital content source 104 that generates media content. As described above, a digital content source can be implemented as one or more of a video camera, a mobile computing device, a desktop computer, a server machine, a gaming console, or some other type of electronic device that is capable of generating media content.

The system disk 214 can include one or more hard disk drives, solid state storage devices, or similar storage devices. The system disk 214 is configured to store non-volatile data such as files (e.g., audio files, video files, video game files, subtitles, application files, software libraries, etc.). As shown in FIG. 2, the system disk 214 is further configured to store one or more digital content files 222.

The system memory 212 includes a digital content application 218 and an encoding application 220. Although shown as separate applications, in some examples, the digital content application 218 and the encoding application 220 are integrated in a single application and/or software module. When executed by the CPU 202, the digital content application 218 receives and/or generates frames of media content streamed to a client device 106. For example, the digital content application 218 can interface with the I/O devices interface 204 or the network interface 206 to receive media content generated by a digital content source 104. As another example, the digital content application 218 retrieves one or more of the digital content files 222 stored in the system disk 214.

In operation, the encoding application 220 encodes media content using a codec and packetizes the encoded media content into frames according to a selected transport format. Hereinafter, packetizing or packaging frames of encoded media content according to a selected transport format can be referred to as generating frames of encoded media content. The encoding application 220 interfaces with network interface 206 to transmit, via the communications network 108, the frames of encoded media content to one or more client devices 106 for playback. In the illustrated example of FIG. 2, the encoding server 102 includes a hardware-based encoder 216 that is configured to execute the encoding application 220 to generate frames of encoded media content. The hardware-based encoder 216 is, for example, a dedicated processor that is separate from the CPU 202 and coupled to the system memory 212 such that the encoder 216 executes the encoding application 220 to generate frames of encoded media content. However, in other examples, the encoder 216 is implemented as a software-based encoder. In such examples, the encoding application 220 can be executed by the CPU 202 to generate frames of encoded media content. Persons skilled in the art will understand that the encoding techniques and functionality described herein with respect to the encoding application 220 can be implemented by a hardware-based encoder, such as the encoder 216, or be implemented in software.

The encoding application 220 can implement one or more known encoding algorithms, or codec, to encode the media content. For example, the encoding application 220 could encode the one or more digital content files 222 using a codec, such as AAC, to generate encoded media content. The encoding application 220 then packetizes the encoded media content into frames using a transport format, such as ADTS. When the encoding application 220 generates and transmits a sequence of frames of encoded media content to the client device 106 for playback, the client device 106 extracts the encoded media content from the frames in the transport format.

The encoding application 220 can also generate extended metadata fields including metadata that is incompatible with or too large to be stored into a header block specified by the selected transport format. In some cases, the encoding application 220 can generate one or more extended metadata fields that do not exist in the header block specified by the selected transport format. The encoding application 220 stores the extended metadata fields in the payload of a respective frame in one or more metadata blocks. The metadata block(s) are appended to the payload of the frame after a portion of the encoded media content. Each metadata block can include one or more extended metadata fields that can be extracted by a client device 106. The metadata block(s) can be separated from the encoded media content stored in the payload of the frame with an extension sync word so that a client device 106 can locate the metadata block(s) by locating the extension sync work. The metadata block(s) can further include an offset field appended onto an end of the frame and prior to a subsequent frame in a bitstream of frames. The offset field identifies a length from an end of the frame to the extension sync word to facilitate location of the metadata block(s) by a client device 106. By utilizing the offset, a client device 106 can locate the metadata block(s) by identifying a sync word of the next frame, reading the offset field, and then seeking backward a number of bits specified by the value of the offset field to locate the extension sync word.

A client application on the client device 106 decodes the encoded media content and subsequently plays back the media content on an output device, such as a display and/or audio playback system. In examples of the disclosure, the client device 106 also extracts extended metadata fields from the metadata block(s) in the payload of the frames, which can contain additional information utilized by the client device 106 to decode the encoded media content. For example, the extended metadata fields within the metadata block(s) include information such as an audio object type (AOT) associated with the portion of the encoded media content, an indication of whether the frame is a sync frame, audio specific configuration data, and/or any other information for configuring decoding operations that cannot be stored in the header block of the frame due to size or incompatibility limitations of the transport format.

Figure 3:
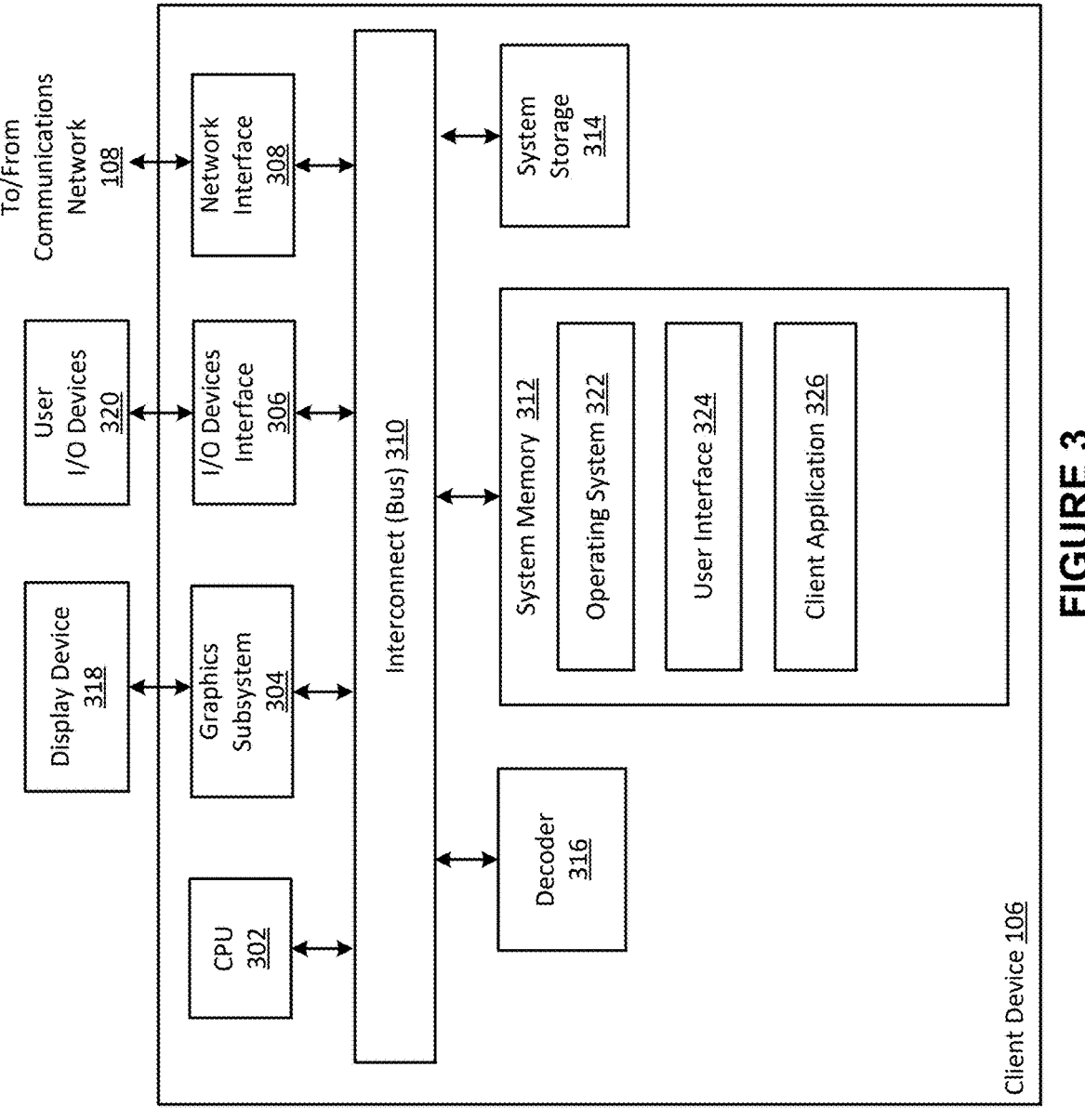
FIG. 3 is a more detailed illustration of one of the client devices of FIG. 1, according to various embodiments.

FIG. 3 is a more detailed illustration of one of the client devices 106 of FIG. 1, according to various embodiments. As shown, a client device 106 includes, without limitation, a CPU 302, a graphics subsystem 304, an I/O device interface 306, a network interface 308, an interconnect 310, a system memory 312, system storage 314, and a decoder 316.

The CPU 302 is configured to retrieve and execute programming instructions stored in the system memory 312. Similarly, the CPU 302 is configured to store and retrieve application data (e.g., software libraries) residing in the system memory 312. The interconnect 310 is configured to facilitate transmission of data, such as programming instructions and application data, between the CPU 302, graphics subsystem 304, I/O devices interface 306, network interface 308, system memory 312, and system storage 314.

The graphics subsystem 304 is configured to receive decoded frames of media content from the client application 326 and transmit the decoded frames of media content to the display device 318 for playback. In some examples, the graphics subsystem 304 is further configured to generate frames of media content. In some examples, the graphics subsystem 304 is integrated into an integrated circuit, along with the CPU 302. The display device 318 can comprise any technically feasible means for generating an image for display. For example, the display device 318 may be fabricated using liquid crystal display (LCD) technology, cathode-ray technology, and light-emitting diode (LED) display technology.

The input/output (I/O) device interface 306 is configured to receive input data from user I/O devices 320 and transmit the input data to the CPU 302 via the interconnect 310. For example, user I/O devices 320 can comprise one or more buttons, a keyboard, and a mouse or other pointing device. The I/O device interface 306 also includes an audio output unit configured to generate an electrical audio output signal. User I/O devices 320 includes a speaker configured to generate an acoustic output in response to the electrical audio output signal. In alternative embodiments, the display device 318 may include the speaker. A television is an example of a device known in the art that can display media content frames and generate an acoustic output.

The network interface 308 is configured to transmit and receive packets of data via the communications network 108. For example, network interface 308 is used to establish a communications session with the encoding server 102 in which frames that are generated by the encoding server 102 according to a particular transport format. In some examples, the network interface 308 is configured to communicate using the well-known Ethernet standard. The network interface 308 is coupled to the CPU 302 via the interconnect 310. The system storage 314 includes one or more storage units, such as a hard disk drive, solid state storage devices, flash memory storage drive, or similar storage devices. The system storage 314 is configured to store non-volatile data such as files (e.g., application files, software libraries, etc.).

The system memory 312 includes programming instructions and application data that comprise an operating system 322, the user interface 324 and the client application 326. The operating system 322 performs system management functions such as managing hardware devices including the network interface 308, system storage 314, I/O device interface 306, and graphics subsystem 304. The operating system 322 also provides process and memory management models for the user interface 324 and the client application 326. In some examples, the operating system 322 can also provide decoding capabilities for encoded media content encoded using a particular codec or the capabilities to extract encoded media content from frames packetized into a bitstream or file according to a transport format. The user interface 324, such as a window and object metaphor, provides a mechanism for user interaction with client device 106. Persons skilled in the art will recognize the various operating systems and user interfaces that are well-known in the art and suitable for incorporation into the client device 106. In some examples, one or more of the operating system 322, the user interface 324 and the client application 326 are integrated into a single application and/or software module. In some examples, the user interface 324 and the client application 326 can be implemented by code executed within a browser, such as JavaScript code embedded into one or more pages generated by a website associated with the encoding server 102.

When executed by the CPU 302, the client application 326 interfaces with network interface 308 to receive frames corresponding to media content that are transmitted by the encoding server 102 to the client device 106. As noted above, the frames correspond to encoded media content that is packetized into frames according to a transport format that is selected for transmission of the encoded media content to the client device 106.

The client application 326 can extract the encoded media content from the frames to play back the digital media content packetized therein. In the illustrated example of FIG. 3, the client device 106 includes a hardware-based decoder 316 that can decode the encoded media content corresponding to the media content for playback. However, the client application 326 can perform decoding operations by implementing or executing a software-based encoder. In such examples, the client application 326 can be executed by the CPU 302 to decode the encoded media content extracted from the frames for playback. Persons skilled in the art will understand that the decoding techniques and functionality described herein with respect to the client application 326 can be implemented by a hardware-based decoder, such as the decoder 316, or be implemented in software in the client application 326. The client application 326 provides the decoded frames of media content to the graphics subsystem 304 or an audio subsystem in the case of audio content. The client device 106 then plays back the decoded media content on an output device, such as a display device 318 or an audio system. The client application 326 can also provide the decoded frames of media content, via the I/O devices interface 306, to any other of the one or more of the user I/O devices 320 for playback.

In operation, the client application 326 extracts encoded media content from the frames that were generated using a selected transport format by locating a sync word to signify the beginning of a particular frame. In the case of a frame generated according to a transport format such as ADTS, a sync word is included in a header block of a respective frame. The client application 326 can identify the beginning of a respective frame by locating the sync word in a bitstream. The client application 326 determines information about a portion of the frame, such as the length of the frame, attributes regarding the portion of the encoded media content embedded in the payload of the frame, error checking data, and other metadata relating to the frame from the header block of the frame. Additionally, in some examples, the client application 326 identifies extended metadata fields in the payload of the frame that are included in metadata blocks appended to the payload of the frame after the portion of the encoded media content. The client application 326 can configure decoding operations to play back the media content packetized in the frames based on the extended metadata fields if the client application 326 is configured to support the extended metadata fields. In examples where the client application 326 is a legacy client device 106 or a device that does not support extended metadata fields stored in the payload of a frame, such a client device 106 can ignore the metadata block(s) and extract only the encoded media content in the payload. Once the encoded media content is extracted from the payload, a legacy client device 106 can locate the sync word corresponding to a subsequent frame in the bitstream from the encoding server 102.

Media Content Frame with Extended Metadata Blocks

Figure 4:
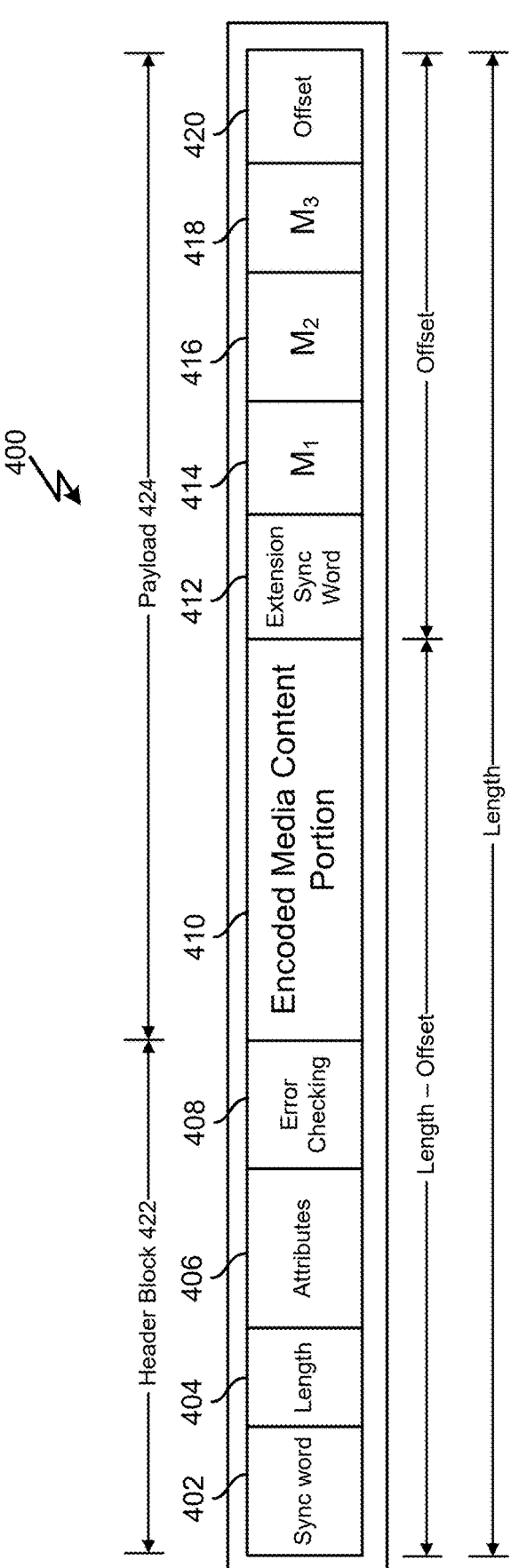
FIG. 4 illustrates an example frame, according to various embodiments.

Referring next to FIG. 4, shown is an example of a frame 400 that is generated according to various embodiments. The frame 400 is generated by the encoding application 220 using a selected transport format. The encoding application 220 can select a transport format according to the characteristics of the encoding server 102 or a client application 326 to which media content is being streamed. For example, the transport format can be selected based upon which transport formats are supported by the encoding server 102 or client application 326 receiving the media content being streamed from the digital content source 104. The selected transport format can include a format that is backward compatible so that legacy client devices 106 or streaming clients that support ADTS can receive and extract a portion of encoded media content that is packetized within the frame 400. Decoding of the portion of encoded media content extracted from the frame 400 can be performed by a client application 326, or a decoder 316 on the client device 106, which can also play back the decoded media content extracted from the frame 400.

The frame 400 includes a sync word 402, a length field 404, an attributes field 406, an error checking field 408, an encoded media content portion 410, an extension sync word 412, extended metadata block 414, extended metadata block 416, extended metadata block 418, and an offset field 420. Each of the extended metadata blocks 414, 416, and 418 include one or more extended metadata fields. The sync word 402, length field 404, and error checking field 408 are stored in header block 422 of the frame 400. The encoded media content portion 410, extension sync word 412, extended metadata block 414, extended metadata block 416, extended metadata block 418, and offset field 420 are stored in a payload 424 of the frame 400. The quantity of extended metadata blocks shown in the example of FIG. 4 is merely illustrative. A person of ordinary skill in the art will recognize that more or fewer metadata blocks can be stored in the payload 424 according to examples of the disclosure.

The frame 400 of FIG. 4 is an example of an ADTS frame that includes extended metadata blocks. Accordingly, the depicted frame 400 is backward compatible with client devices 106 that support ADTS and that may or may not support the information stored in the extended metadata fields. However, even if the client device 106 does not support the extended metadata fields, the client device 106 can still extract the encoded media content in the bitstream of the frames 400.

The depicted frame 400 begins with a sync word 402. The sync word 402 designates a beginning of the frame 400. The sync word 402 is contained in header block 422 of the frame 400. The header block 422 is a portion of the frame 400 that does not include the payload 424 of the frame 400. Continuing within the header block 422, following the sync word 402 is a length field 404 that specifies a length of the frame 400. The encoding application 220, when generating the frame 400, calculates a length of a given frame 400 based on the length or size of a header block 422, the encoded media content portion 410 designated for the frame 400, and the length of the extension sync word 412, extended metadata blocks 414, 416, and 418, and the offset field 420. The encoding application 220 populates the length field 404 with an overall length of the frame 400. The frame 400 further includes attributes field 406. The attribute field 406 contains metadata specified by the transport format, such as ADTS. The transport format can impose limitations on the type and size of data that can be stored in the attributes field 406. Accordingly, as media codecs evolve and potentially require additional metadata to configure modern media content decoders, additional metadata is beneficial to accompany each frame 400 that is transmitted to a client device 106. The header block 422 can optionally include error checking field 408. The error checking field 408 includes error checking data, such as cyclic redundancy check value or another type of error checking or checksum value with which a client device 106 validates the integrity of a frame 400 that is received.

The payload 424 of the frame 400 includes an encoded media content portion 410. The encoded media content portion 410 comprises a portion of one or more encoded media content that is encoded by the encoding application 220 and packetized into the frame 400. The encoded media content portion 410 is created by the encoding application 220 by encoding one or more digital content files 222 into encoded media content using a codec, such as AAC, and then segmenting the encoded media content into portions that can be packetized into one or more frames (e.g., frame 400) that are streamed to a client device 106 for playback.

The payload 424 of the frame 400 also includes an extension sync word 412 that is appended to the encoded media content portion 410 in the payload 424 portion of the frame 400. The extension sync word 412 represents a series of bits that are used to identify the beginning of the metadata block(s) in the frame 400. The extension sync extension sync word 412 is different from the sync word 402 used to designate the beginning of a frame 400. The extension sync word 412 is inserted into the frame 400 between the encoded media content portion 410 and the metadata block(s) to indicate the end of the encoded media content portion 410 and the beginning of the metadata block(s) within the frame 400.

Following the extension sync word 412 are one or more extended metadata blocks. In the depicted illustrative and non-limiting example, extended metadata block 414, extended metadata block 416, and extended metadata block 418 are shown following the extension sync word 412. In one example, the frame 400 represents an ADTS frame that is generated by the encoding application 220 with extended metadata fields. In this example, the extended metadata block 414 stores an audio object type (AOT) field, extended metadata block 416 stores an indication of whether the encoded media content portion 410 represents a sync frame, and the extended metadata block 416 stores audio specific configuration (ASC) data.

Following the extended metadata blocks in the frame 400 is the offset field 420. The offset field 420 is calculated by the encoding application 220 when generating the frame 400 and stores a distance from the end of the frame 400 to the extension sync word 412. The offset field 420 is stored in the frame 400 so that an encoding server 102 or client application 326 unpacking the frame 400 and accessing the metadata block(s) can efficiently locate the metadata block(s) in the payload 424 of the frame 400.

Figure 5:
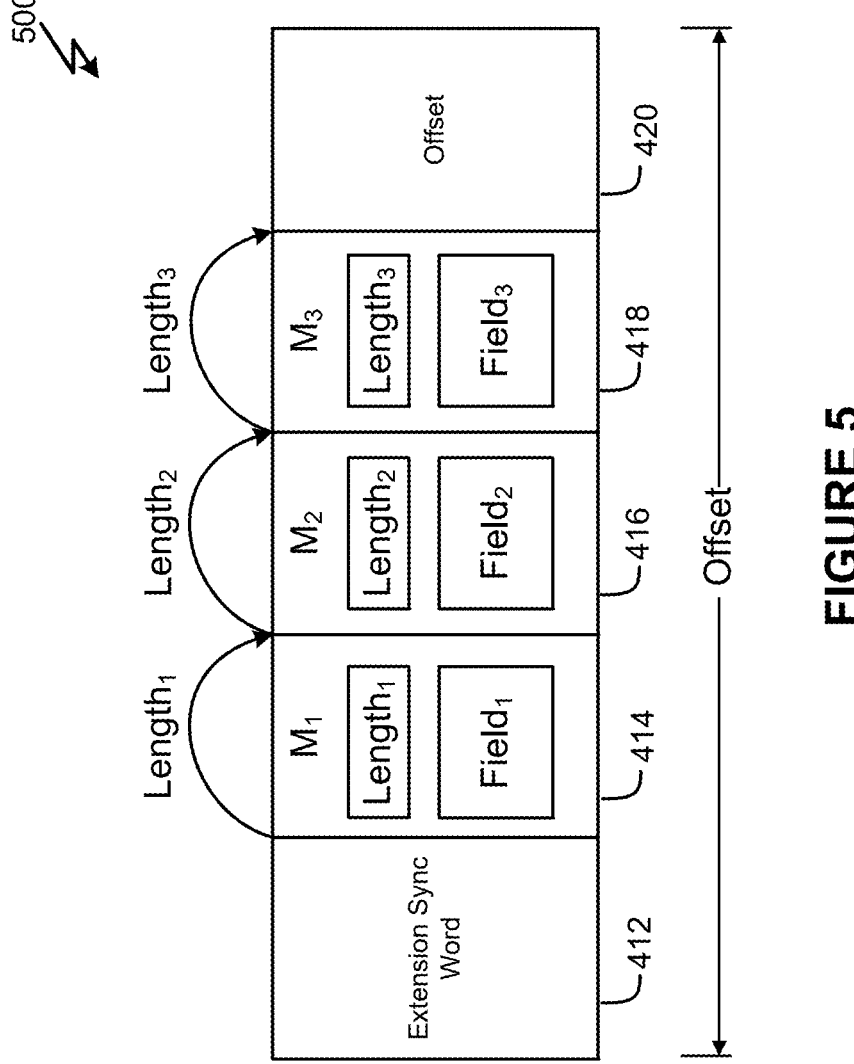
FIG. 5 illustrates an example extended metadata block of a frame, according to various embodiments.

FIG. 5 illustrates an example of extended metadata block(s) 500, according to various embodiments. As noted above, the metadata block(s) 500, which as shown include metadata blocks 414, 416, and 418, can be appended to payload 424 of a frame 400 after the media content portion 410. In the example of FIG. 5, the metadata block(s) 500 is again shown following an extension sync word 412, which separates the encoded media content portion 410 from the metadata block(s) 500 within the payload 424 of the frame 400.

Additionally, the quantity of extended metadata blocks shown in the example of FIG. 5 is again merely illustrative. A person of ordinary skill in the art will recognize that more or fewer metadata blocks can be included in the metadata block(s) 500 according to examples of the disclosure. In the example of FIG. 5, the encoding application 220, when generating the metadata block(s) 500 can include within each extended metadata block 414, 416, and 418, a length field. In the example shown, extended metadata block 414 includes $Length_1$ and $Field_1$, representing an extended metadata field. Extended metadata block 416 includes $Length_2$ and $Field_2$, representing an extended metadata field, and extended metadata block 418 includes $Lengths$ and $Field_3$, representing an extended metadata field. By including a length field in each of the respective extended metadata blocks 414, 416, and 418, a client device 106 decoding the frame 400 can easily identify the location of each of the metadata blocks within the metadata block(s) 500.

For example, a client device 106 decoding the frame 400 can navigate from the sync word 402 to the offset field 420 using the length field 404. In this scenario, the offset field 420 can be located by navigating to the offset field 420 by determining its location from the length of the frame 400 specified by the length field 404. Then, a client device 106 navigates from the offset field 420 back to the extension sync word 412 based upon the value of the offset stored in the offset field 420. Once the extension sync word 412 is located, the client device 106 can navigate to any of the respective metadata blocks based upon their respective length fields.

Accordingly, examples of the disclosure provide for an enhancement on existing transport formats by allowing extended metadata block(s) (e.g., extended metadata blocks 414, 416, and 418) to be appended to the encoded media content portion 410 within a payload 424 of a frame 400 that is generated according to a particular transport format, such as ADTS. The metadata block(s) offer versatility and improved functionality while maintaining backward compatibility with existing media decoders that might be implemented by a client device 106 receiving a bitstream of one or more frames 400. Legacy client devices 106 or players can process the one or more frames 400 as legacy players by disregarding the metadata block(s) 500. However, the data stored in the metadata block(s) 500, which is either incompatible with or too large to be stored in the attributes field 406 of the frame 400, can be utilized for advanced codecs that remain backward compatible, where specific Audio Object Types, such as AOT type 42, require Audio Specific Config (ASC) data to configure a decoder being utilized by a client device 106 that is compatible with the more advanced codecs. Additionally, by including a sync frame indication within a possible metadata block, decoders are able to identify and skip non-sync frames by examining only a metadata block that contains the indication, thereby streamlining the decoding process with low latency during playback. Examples of the disclosure provide for the ability to utilize backward compatible transport formats such as ADTS to support advanced decoding strategies that are linked to the additional metadata that can be stored in extended metadata blocks.

Figure 6:
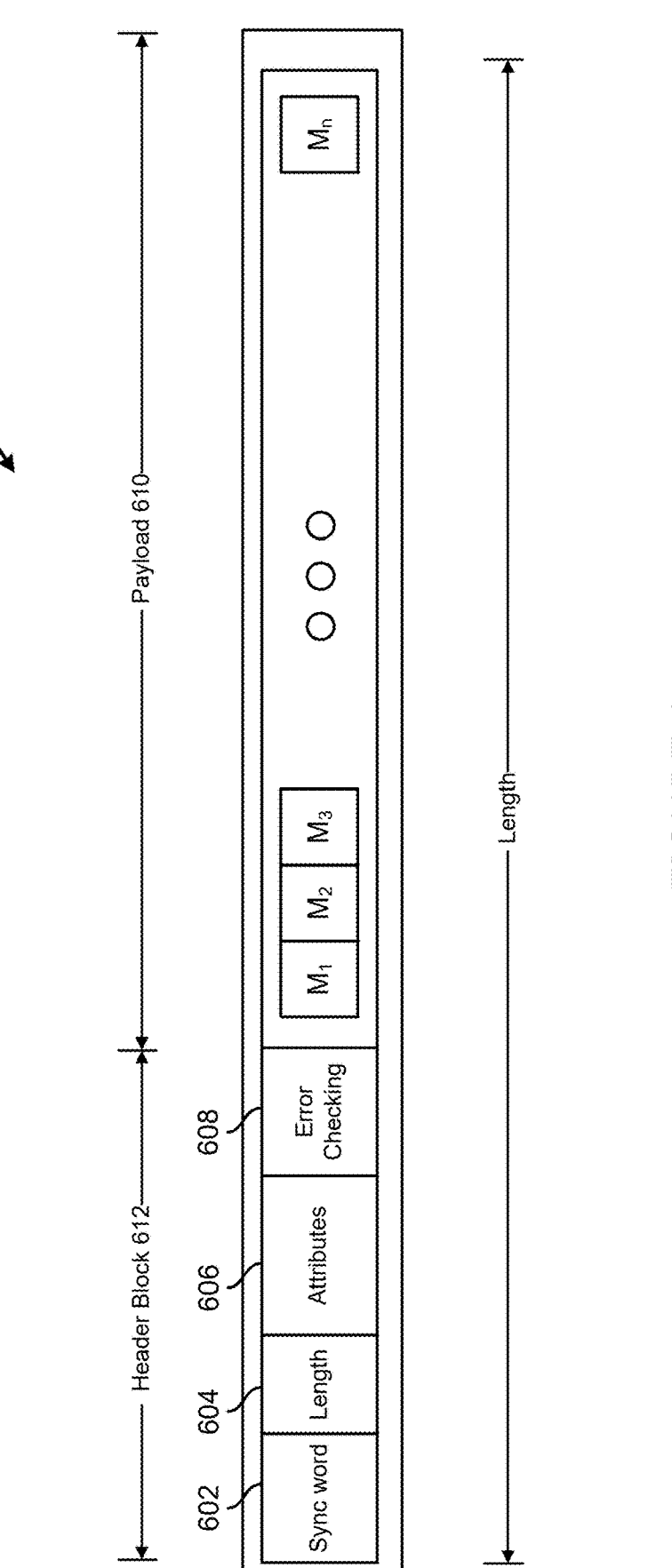
FIG. 6 illustrates an extended metadata transport frame, according to various embodiments.

FIG. 6 illustrates an alternative example of a frame 600, according to various embodiments. The example of FIG. 6 shows an alternative transport format that can be utilized by the encoding application 220 to encode media content into frames for streaming to a client device 106. In the example of FIG. 6, the extended metadata transport frame 600 illustrates a scalable media transport format that allows for extended metadata blocks. The extended metadata transport frame 600 includes a sync word 602, length field 604, data attributes 606, error checking field 608, and a payload 610. Within the payload 610 are extended metadata blocks $M_1$, $M_2$, $M_3$ through $M_n$, which represent an indication that the payload 610 can include any number of extended metadata blocks.

The extended metadata transport frame 600 of FIG. 6 is an example of frame according to a transport format that includes extended metadata blocks within the payload 610 of the extended metadata transport frame 600. Accordingly, the depicted extended metadata transport frame 600 is a scalable transport format that allows for any number of metadata blocks to be embedded therein.

The depicted extended metadata transport frame 600 begins with a sync word 602. The sync word 602 designates a beginning of the extended metadata transport frame 600. The sync word 602 is contained in a header block 612 of the extended metadata transport frame 600. The header block 612 is a portion of the extended metadata transport frame 600 that does not include the payload 610 of the extended metadata transport frame 600. Continuing within header block 612, following the header block 612 is a length field 604 that specifies a length of the extended metadata transport frame 600. The encoding application 220, when generating the extended metadata transport frame 600, calculates a length of a given extended metadata transport frame 600 based on the length or size of a payload 610 and header block 612. The encoding application 220 populates the length field 604 with an overall length of the extended metadata transport frame 600. The extended metadata transport frame 600 further includes data attributes 606. The extended metadata transport frame 600 includes metadata specified by the transport format. As in the case of the example of FIGS. 4-6, the transport format can impose limitations on the type and size of data that can be stored in the data attributes 606. The header block 612 can optionally include error checking field 608. The error checking field 608 includes error checking data, such as cyclic redundancy check value or another type of error checking or checksum value with which a client device 106 validates the integrity of an extended metadata transport frame 600 that is received.

The payload 610 of the extended metadata transport frame 600 includes one or more extended metadata blocks that the encoding application 220 can populate with extended metadata used to configure decoding operations on the client device 106 receiving the extended metadata transport frame 600. The extended metadata transport frame 600 comprises a nesting metadata block that includes one or multiple metadata blocks as the payload 610. The error checking field 608 in the header block 612 makes the extended metadata transport frame 600 suitable as a media transport format into which encoded media can be stored in the payload 610 along with the extended metadata blocks. The error checking field 608 is optional because in some implementations, a network stack utilized to stream the extended metadata transport frame 600 to a client device 106 provides data protection. Therefore, redundancy of protection can be considered unnecessary for practical applications. The error checking field 608 can be utilized when the extended metadata transport frame 600 is utilized for livestreaming applications.

The extended metadata transport frame 600 provides for media content to be encoded into encoded media content, packetized into one or more extended metadata transport frames 600, and streamed to a client device 106. The extended metadata transport frame 600 provides a recursive transport metadata block structure. Each of the metadata blocks in the payload 610 can encapsulate standalone data as well as nest additional metadata blocks within a respective metadata block. The hierarchical structure allows for a modular and scalable system of metadata management. Each metadata block within the payload 610 can independently contain metadata blocks while also providing the capability to aggregate and structure multiple metadata blocks. The nesting capability enhances data encapsulation and organization, enabling complex and layered metadata architectures, which supports a dynamic range of applications, from simple to highly complex media environments, by allowing for deep and flexible data hierarchies that can be tailored to specific needs and expanded.

In some embodiments, each respective extended metadata block within the payload 610 can begin with an extension sync word so that a client device 106 can identify a beginning of a respective extended metadata block within the payload 610. In this way, each extended metadata block is separated from one another by the extension sync word. As in the example of extended metadata block(s) 500, the extension sync word can be different from the sync word 602 used to identify the beginning of the extended metadata transport frame 600. Additionally, one or more of the extended metadata blocks within the payload 610 of the extended metadata transport frame 600 can contain a portion of encoded media content. The one or more extended metadata blocks can also contain one or more metadata fields used to configure decoding operations on a client device 106 to which extended metadata transport frames 600 are transmitted.

Persons skilled in the art should understand that the example frame 400, extended metadata block(s) 500, and extended metadata transport frame 600 illustrated in FIGS. 4-6 are provided as non-limiting examples and that the encoding application 220 can transition between using various transport formats to transmit frames of media content to one or more client devices. In general, while the encoding application 220 generates and transmits sequences of frames that can include extended metadata block(s) 500 in a respective payload of a frame 400, it should be appreciated that the encoding application 220 can also utilize other transport formats to stream media content to one or more client devices.

FIG. 7 is a flow diagram of method steps for generating frames of media content, according to various embodiments. Although the method steps are described with reference to the systems and processes of FIGS. 1-6, persons skilled in the art will understand that any system configured to implement the method steps, in any order, falls within the scope of the present invention.

As shown, a method 700 begins at step 702, where media content for streaming to a client device 106 is obtained. For example, the encoding application 220 could obtain one or more digital content files 222 or media content from a digital content source 104, such as a live content source. The media content can include audio content, video content, or a combination of audio and video content.

At step 704, the encoding application 220 selects a codec with which to encode the media content to generated encoded media content. The codec is selected based upon a type of the media content, such as whether the media content is audio content, video content, or a combination of audio and video content. The codec can also be selected based upon a type of client device 106 to which the media content is being streamed. For example, a client application 326 running on a client device 106 can establish a streaming session with the encoding application 220 and based upon parameters exchanged when establishing the session, the encoding application 220 determines the supported codecs for the client device 106.

At step 706, the encoding application 220 segments the encoded media content into portions for transport via frames 400 according to a selected transport format. The encoding application 220 selects a transport format based upon compatibility with the codec utilized to generate the encoded media content and compatibility with the client device 106 to which the media content is being streamed. The transport format specifies a format for a header block 422 in which metadata is stored as well as a payload 424 into which a portion of the encoded media content is packetized for transport to the client device 106 via frames 400.

At step 708, the encoding application 220 generates the header block 422 for a frame 400 and extended metadata block that can be packetized into the payload 424 of the frame 400. The header block 422 includes the attributes field 406, which stores metadata that is supported by the selected transport format. As noted above, the selected transport format may not support all forms of metadata that can be utilized to configure decoder operations on a client device 106 with respect to decoding the encoded media content. Accordingly, the encoding application 220 also generates extended metadata fields that can be stored in one or more extended metadata blocks in the payload 424 of the frame 400. For example, the extended metadata fields could include an AOT, an indication of whether the frame 400 comprises a sync frame, and/or ASC data.

At step 710, the encoding application 220 calculates a length of the frame 400 based upon the payload 424 and the header block 422. The length of the frame 400 can be inserted into the length field 404 of the frame 400. The encoding application 220 also calculates an offset value for the offset field 420 of the metadata block(s). The offset represents a distance from the end of the frame 400 to the extension sync word 412 of the metadata block(s). The length field 404 and the offset field 420 are used by a client device 106 receiving the frame 400 to efficiently locate the metadata block(s).

At step 712, the encoding application 220 creates the frame 400 that includes the header block 422, the portion of the encoded media content, and the metadata block(s). The portion of the encoded media content and the metadata block(s) are stored in the payload 424 of the frame 400.

At step 714, the frame 400 is transmitted to the client device 106. A client application 326 running on the client device 106 can extract a portion of encoded media content from the frame 400. The client application 326 can also decode the portion of encoded media content to play back the media content on the client device 106, as described in greater detail below in conjunction with FIG. 8.

FIG. 8 is a flow diagram of method steps for extracting and decoding media content embedded into frames that are created according to a transport format and in which extended metadata blocks are stored in the payload of respective frames, according to various embodiments. Although the method steps are described with reference to the systems and processes of FIGS. 1-6, persons skilled in the art will understand that any system configured to implement the method steps, in any order, falls within the scope of the present invention. It should be appreciated that the steps illustrated in FIG. 8 can be performed by any hardware or software of the client device 106 for playback of media content.

As shown, a method 800 begins at step 802, where the client device 106 obtains a frame 400 from the encoding server 102. The frame 400 is generated according to a transport format selected by the encoding application 220 in which portions of encoded media content are streamed by the encoding server 102 to the client device 106. Additionally, the frame 400 includes one or more extended metadata blocks in the payload 424 of the frame 400 after the encoded media content portion 410 of the payload 424. In some embodiments, the frame 400 can be generated according to the method 700, described above in conjunction with FIG. 7.

At step 804, the client device 106 identifies a sync word 402 to locate the beginning of the frame 400. As noted above, the sync word 402 comprises a series of bits that identify a beginning of a respective frame 400.

At step 806, the client device 106 determines a length of the frame 400 from a length field 404 in the header block 422 of the frame 400. The length field 404 specifies a length of the frame 400 including the header block 422 and the payload 424 of the frame 400.

At step 808, the client device 106 determines the offset associated with the metadata block(s). The offset field 420 is located at the end of the frame 400, as indicated by the length field 404. The offset field 420 stores the value of the offset, which represents a distance from the end of the frame 400 to the beginning of the metadata block(s). Using the offset, the client device 106 can efficiently locate the metadata block(s) by navigating from an end of the frame 400 backwards by a distance equal to the offset.

At step 810, the client device 106 identifies the metadata block(s) based upon the length and the offset. From the beginning of the frame 400, or from the sync word 402 of the frame 400, the client device 106 can locate the end of the frame 400 based on the length. From the end of the frame 400, the client device 106 can locate the beginning of the metadata block(s) based on the offset.

At step 812, the client device 106 can extract one or more extended metadata fields from the metadata block(s). As noted above, the extended metadata fields contain metadata that is incompatible with or too large to store in the header block 422 that is specified by the transport format being used to transport the encoded media content. The extended metadata fields are used by the client device 106 to configure decoding operations specified by a codec used to encode the media content. In some examples, the client device 106 can navigate between extended metadata blocks using a length field included within each extended metadata block.

At step 814, the client device 106 decodes the encoded media content portion 410 included in the frame 400. The client device 106 utilizes the attributes field 406, where metadata supported by the transport format is stored. The client device 106 also utilizes the extended metadata fields extracted from the payload 424 of the frame 400 to configure decoding operations performed by a software or hardware decoder to decode and play back the media content.

FIG. 9 is a flow diagram of method steps for generating extended metadata transport frames of media content, according to various embodiments. Although the method steps are described with reference to the systems and processes of FIGS. 1-6, persons skilled in the art will understand that any system configured to implement the method steps, in any order, falls within the scope of the present invention.

As shown, a method 900 begins at step 902, where media content for streaming to a client device 106 is obtained. For example, the encoding application 220 could obtain one or more digital content files 222 or media content from a digital content source 104, such as a live content source. The media content can include audio content, video content, or a combination of audio and video content.

At step 904, the encoding application 220 selects a codec with which to encode the media content to generate encoded media content. The codec is selected based upon a type of the media content, such as whether the media content is audio content, video content, or a combination of audio and video content. The codec can also be selected based upon a type of client device 106 to which the media content is being streamed. For example, a client application 326 running on a client device 106 can establish a streaming session with the encoding application 220 and based upon parameters exchanged when establishing the session, the encoding application 220 determines the supported codecs for the client device 106.

At step 906, the encoding application 220 segments the encoded media content into portions for transport via frames 400 according to a selected transport format. In the example of FIG. 9, the selected transport formats can utilize one or more extended metadata transport frames 600 as shown in the example of FIG. 6.

At step 908, the encoding application 220 generates the header block 612 for an extended metadata transport frame 600. The length of the extended metadata transport frame 600 can be inserted into the length field 604 of the extended metadata transport frame 600. The header block 612 includes the data attributes 606, which stores at least a portion of metadata that is included in the extended metadata transport frame 600. Additionally, the encoding application 220 also generates extended metadata fields that can be stored in a nesting metadata block that includes one or more extended metadata blocks in the payload 610 of the extended metadata transport frame 600. The extended metadata blocks can also include a portion of the encoded media content.

At step 912, the encoding application 220 creates the extended metadata transport frame 600 that includes the header block 612 and the payload 610. Within the payload 610, each of the extended metadata blocks in the nesting metadata block, including one or more of the metadata blocks storing a portion of the encoded media content and one or more metadata blocks that include metadata fields used to configure a decoder to decode the encoded media content, begins with an extension sync word so that a client device 106 can identify the beginning of a respective extended metadata block. Additionally, each of the extended metadata blocks can also include a respective header that the client device 106 can utilize to identify the contents of a respective extended metadata block.

At 912, the extended metadata transport frame 600 is transmitted to the client device 106. The extended metadata transport frame 600 can then be decoded by a client application 326 running on the client device 106, and the encoded media content transported by one or more extended metadata transport frames 600 can be decoded by a decoder to play back the media content on the client device 106, as described in greater detail below in conjunction with FIG. 10.

FIG. 10 is a flow diagram of method steps for extracting and decoding media content included in extended metadata transport frames, according to various embodiments. Although the method steps are described with reference to the systems and processes of FIGS. 1-6, persons skilled in the art will understand that any system configured to implement the method steps, in any order, falls within the scope of the present invention. It should be appreciated that the steps illustrated in FIG. 10 can be performed by any hardware or software of the client device 106 for playback of media content.

As shown, a method 1000 begins at step 1002, where the client device 106 obtains an extended metadata transport frame 600 from the encoding server 102. The extended metadata transport frame 600 is encoded according to a transport format selected by the encoding application 220 in which portions of encoded media content are streamed by the encoding server 102 to the client device 106. Additionally, the extended metadata transport frame 600 includes a nested metadata block in the payload 610 of the extended metadata transport frame 600. In some embodiments, the extended metadata transport frame 600 can be generated according to the method 900, described above in conjunction with FIG. 9.

At step 1004, the client device 106 identifies a sync word 402 to locate the beginning of the extended metadata transport frame 600. As noted above, the sync word 602 includes a series of bits that identify a beginning of a respective extended metadata transport frame 600.

At step 1006, the client device 106 identifies the metadata block(s) in the payload 610 by identifying an extension sync word. Within the payload 610, one or more metadata blocks can be stored in the payload 610 of the extended metadata transport frame 600 and separated from one another by the extension sync word.

At step 1008, the client device 106 can extract one or more extended metadata fields from the metadata block(s). As noted above, the extended metadata blocks include metadata fields used by the client device 106 to configure decoding operations specified by a codec used to encode the media content. Additionally, in the case of an extended metadata transport frame 600, one or more of the extended metadata blocks can include a portion of encoded media content that is segmented into portions to be packetized into one or more extended metadata transport frames 600.

At step 1010, the client device 106 decodes the encoded media content portion included in a metadata block from the payload 610 of the extended metadata transport frame 600. The client device 106 utilizes the data attributes 606 and the extended metadata blocks from the payload 610 to configure decoding operations performed by a software or hardware decoder to decode and play back the media content.

In sum, the disclosed techniques can be used to transport media content that is encoded using any number of codecs. Additionally, the disclosed techniques can provide this flexibility using a backward-compatible container format such as ADTS. In some embodiments, an encoding server can utilize a legacy media transport format to packetize encoded media content in a frame that restricts the amount and type of information that can be stored in the header of the frame. Additional metadata fields can be stored in one or more metadata blocks, which are appended to a payload of the frame that includes the portion of the encoded audio content.

The payload of the frame is often unrestricted by the transport format in terms of the amount of data that can be stored therein. The metadata block(s) can be separated from the encoded media content by an extension sync word, which is different from a sync word that is used to designate the beginning of a new frame. The metadata block(s) containing metadata fields can be appended to a portion of the encoded media content packetized into the frame, and an offset parameter appended to the payload of the frame after the metadata block. The offset parameter specifies the distance from the end of the frame to the beginning of the extension sync word so that a client device receiving and unpacking the frame can quickly access the metadata block(s) stored in the payload of the frame. A client device can locate the metadata block(s) by identifying the offset parameter at the end of the frame using the length field and then seeking backward from the offset parameter by a distance specified by the offset parameter to locate the extension sync word before the metadata blocks.

In some other embodiments, a new transport frame format in which the payload of a frame includes a nesting metadata block that includes one or multiple metadata blocks that include metadata fields as data of the nesting metadata block. The frame can include a protection field that includes error checking data that can be utilized by client applications to verify the integrity of the frame. In the nesting metadata block, each metadata field can encapsulate not only standalone metadata but also nest additional metadata blocks that include metadata fields. Additionally, the nesting metadata block can also include encoded media content. The metadata blocks in the nesting metadata block can be separated by an extension sync word. A client device can locate the metadata blocks within the nesting metadata block by identifying the extension sync word in a payload of the frame.

At least one technical advantage of the disclosed techniques relative to the prior art is that, when implemented, the disclosed techniques results in an extension in the amount of metadata that can be stored in frames generated using media container formats, such as ADTS, that limit the amount of metadata that can be stored in a header block. Another technical advantage of the disclosed techniques results in more adequate representation of codecs that are used to encode media content that is transmitted using certain transport formats relative to prior art approaches, which results in more optimal decoding settings when newer or less common codecs are utilized.

These technical advantages provide one or more technological improvements over prior art approaches.

1. In some embodiments, a computer-implemented method for generating and transmitting frames of media content to client devices comprises generating a frame for a portion of media content, generating a header for the frame based on the portion of the media content, generating one or more metadata blocks for the frame corresponding to a media encoding format, wherein the one or more metadata blocks include metadata incompatible with the header, incorporating the header into a header portion of the frame, incorporating the portion of media content and the one or more metadata blocks into a payload portion of the frame, and transmitting the frame to a client device for playback.

2. The computer-implemented method of clause 1, wherein the frame is generated according to a backward-compatible transport format.

3. The computer-implemented method of clauses 1 or 2, further comprising calculating a length field based on the header, the portion of media content, and the one or more metadata blocks, and incorporating the length field into the header.

4. The computer-implemented method of any of clauses 1-3, comprising incorporating, into the payload portion of the frame before the one or more metadata blocks, an extension sync word that is different from a sync word included in the header.

5. The computer-implemented method of any of clauses 1-4, further comprising calculating an offset representing a distance from an end of the frame to a beginning of the one or more metadata blocks, and incorporating the offset into an end of the payload portion of the frame.

6. The computer-implemented method of any of clauses 1-5, wherein generating each metadata block included in the one or more metadata blocks comprises generating at least one extended metadata field corresponding to the portion of media content based on the media encoding format, and incorporating the at least one extended metadata field into the metadata block.

7. The computer-implemented method of any of clauses 1-6, wherein each metadata block included in the one or more metadata blocks includes a length field specifying a length of the metadata block.

8. The computer-implemented method of any of clauses 1-7, wherein at least one metadata block included in the one or more metadata blocks includes a plurality of metadata fields, and the plurality of metadata fields includes at least one of an audio object type block, a sync frame block indicating whether the frame is a sync frame, or an audio-specific configuration block.

9. The computer-implemented method of any of clauses 1-8, wherein generating the header comprises generating a protection field that includes error checking data.

10. The computer-implemented method of any of clauses 1-9, wherein the backward-compatible transport data format comprises an audio data transport stream.

11. In some embodiments, one or more non-transitory computer-readable storage media include instructions that, when executed by one or more processors, cause the one or more processors to perform the steps of generating a frame for a portion of media content, generating a header for the frame based on the portion of the media content and in accordance with the backward-compatible transport data format, generating one or more metadata blocks for the frame corresponding to a media encoding format, wherein the one or more metadata blocks include metadata incompatible with the header, incorporating the header into a header portion of the frame, incorporating the portion of media content and the metadata block into a payload portion of the frame, and transmitting the frame to a client device for playback.

12. The one or more non-transitory computer-readable storage media of clause 11, wherein the frame is generated according to a backward-compatible transport format.

13. The one or more non-transitory computer-readable storage media of clauses 11 or 12, further comprising calculating a length field based upon the header, the portion of the media content, and the one or more metadata blocks, and incorporating the length field into the header.

14. The one or more non-transitory computer-readable storage media of any of clauses 11-13, comprising incorporating, into the payload portion of the frame before the one or more metadata blocks, an extension sync word that is different from a sync word included in the header.

15. The one or more non-transitory computer-readable storage media of any of clauses 11-14, further comprising calculating an offset representing a distance from an end of the frame to a beginning of the one or more metadata blocks, and incorporating the offset into an end of the payload portion of the frame.

16. The one or more non-transitory computer-readable storage media of any of clauses 11-15, wherein generating each metadata block included in the one or more metadata blocks comprises generating at least one extended metadata field corresponding to the portion of media content based on the media encoding format, and incorporating the at least one extended metadata field into the metadata block.

17. The one or more non-transitory computer-readable storage media of any of clauses 11-16, wherein the metadata block comprises decoder parameters for configuring a decoder on the client device.

18. The one or more non-transitory computer-readable storage media of any of clauses 11-17, wherein the media encoding format specifies metadata that is too large to store in the header.

19. The one or more non-transitory computer-readable storage media of any of clauses 11-18, wherein the media encoding format specifies metadata fields that do not exist in the header.

20. In some embodiments, a system comprises one or more memories storing instructions, and one or more processors that are coupled to the one or more memories and, when executing the instructions, are configured to perform the steps of generating a frame for a portion of media content, generating a header for the frame based on the portion of the media content, generating one or more metadata blocks for the frame corresponding to a media encoding format, wherein the one or more metadata blocks include metadata incompatible with the header, incorporating the header into a header portion of the frame, incorporating the portion of media content and the one or more metadata blocks into a payload portion of the frame, and transmitting the frame to a client device for playback.

Any and all combinations of any of the claim elements recited in any of the claims and/or any elements described in this application, in any fashion, fall within the contemplated scope of the present disclosure and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method, or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention has been described above with reference to specific embodiments. Persons of ordinary skill in the art, however, will understand that various modifications and changes may be made thereto without departing from the broader spirit and scope of the invention as set forth in the appended claims. For example, and without limitation, although many of the descriptions herein refer to specific types of application data, content servers, and client devices, persons skilled in the art will appreciate that the systems and techniques described herein are applicable to other types of application data, content servers, and client devices. The foregoing description and drawings are, accordingly, to be regarded in an illustrative rather than a restrictive sense.

What is claimed is:

1. A computer-implemented method for generating and transmitting frames of media content to client devices, the method comprising:
   generating a frame for a portion of media content;
   generating a header for the frame based on the portion of the media content;
   generating one or more metadata blocks for the frame corresponding to a media encoding format, wherein the one or more metadata blocks include metadata incompatible with the header;
   incorporating the header into a header portion of the frame;
   incorporating the portion of media content and the one or more metadata blocks into a payload portion of the frame; and
   transmitting the frame to a client device for playback.

2. The computer-implemented method of claim 1, wherein the frame is generated according to a backward-compatible transport format.

3. The computer-implemented method of claim 2, wherein the backward-compatible transport format comprises an audio data transport stream.

4. The computer-implemented method of claim 1, comprising incorporating, into the payload portion of the frame before the one or more metadata blocks, an extension sync word that is different from a sync word included in the header.

5. The computer-implemented method of claim 1, further comprising:
   calculating an offset representing a distance from an end of the frame to a beginning of the one or more metadata blocks; and
   incorporating the offset into an end of the payload portion of the frame.

6. The computer-implemented method of claim 1, wherein generating each metadata block included in the one or more metadata blocks comprises:
   generating at least one extended metadata field corresponding to the portion of media content based on the media encoding format; and
   incorporating the at least one extended metadata field into the metadata block.

7. The computer-implemented method of claim 1, wherein each metadata block included in the one or more metadata blocks includes a length field specifying a length of the metadata block.

8. The computer-implemented method of claim 1, wherein at least one metadata block included in the one or more metadata blocks includes a plurality of metadata fields, and the plurality of metadata fields includes at least one of an audio object type block, a sync frame block indicating whether the frame is a sync frame, or an audio-specific configuration block.

9. The computer-implemented method of claim 1, wherein generating the header comprises generating a protection field that includes error checking data.

10. The computer-implemented method of claim 1, further comprising:
   calculating a length field based on the header, the portion of media content, and the one or more metadata blocks; and
   incorporating the length field into the header.

11. One or more non-transitory computer-readable storage media including instructions that, when executed by one or more processors, cause the one or more processors to perform the steps of:

generating a frame for a portion of media content;

generating a header for the frame based on the portion of the media content;

generating one or more metadata blocks for the frame corresponding to a media encoding format, wherein the one or more metadata blocks include metadata incompatible with the header;

incorporating the header into a header portion of the frame;

incorporating the portion of media content and the one or more metadata blocks into a payload portion of the frame; and transmitting the frame to a client device for playback.

12. The one or more non-transitory computer-readable storage media of claim 11, wherein the frame is generated according to a backward-compatible transport format.

13. The one or more non-transitory computer-readable storage media of claim 11, further comprising:

calculating a length field based upon the header, the portion of the media content, and the one or more metadata blocks; and incorporating the length field into the header.

14. The one or more non-transitory computer-readable storage media of claim 11, comprising incorporating, into the payload portion of the frame before the one or more metadata blocks, an extension sync word that is different from a sync word included in the header.

15. The one or more non-transitory computer-readable storage media of claim 11, further comprising:

calculating an offset representing a distance from an end of the frame to a beginning of the one or more metadata blocks; and incorporating the offset into an end of the payload portion of the frame.

16. The one or more non-transitory computer-readable storage media of claim 11, wherein generating each metadata block included in the one or more metadata blocks comprises:

generating at least one extended metadata field corresponding to the portion of media content based on the media encoding format; and incorporating the at least one extended metadata field into the metadata block.

17. The one or more non-transitory computer-readable storage media of claim 11, wherein the one or more metadata blocks comprise decoder parameters for configuring a decoder on the client device.

18. The one or more non-transitory computer-readable storage media of claim 11, wherein the media encoding format specifies metadata that is too large to store in the header.

19. The one or more non-transitory computer-readable storage media of claim 11, wherein the media encoding format specifies metadata fields that do not exist in the header.

20. A system, comprising:

one or more memories storing instructions; and one or more processors that are coupled to the one or more memories and, when executing the instructions, are configured to perform the steps of:

generating a frame for a portion of media content;

generating a header for the frame based on the portion of the media content;

generating one or more metadata blocks for the frame corresponding to a media encoding format, wherein the one or more metadata blocks include metadata incompatible with the header;

incorporating the header into a header portion of the frame;

incorporating the portion of media content and the one or more metadata blocks into a payload portion of the frame; and transmitting the frame to a client device for playback.

* * * * *